(12) United States Patent
Deghel et al.

(10) Patent No.: US 12,363,698 B2
(45) Date of Patent: Jul. 15, 2025

(54) APPARATUS, METHOD, AND COMPUTER PROGRAM

(71) Applicant: NOKIA TECHNOLOGIES OY, Espoo (FI)

(72) Inventors: Matha Deghel, Paris (FR); Emad Farag, Flanders, NJ (US); Frank Frederiksen, Klarup (DK); Zexian Li, Espoo (FI)

(73) Assignee: Nokia Technologies Oy, Espoo (FI)

( * ) Notice: Subject to any disclaimer, the term of this patent is extended or adjusted under 35 U.S.C. 154(b) by 584 days.

(21) Appl. No.: 17/753,475

(22) PCT Filed: Sep. 13, 2019

(86) PCT No.: PCT/EP2019/074488
§ 371 (c)(1),
(2) Date: Mar. 4, 2022

(87) PCT Pub. No.: WO2021/047780
PCT Pub. Date: Mar. 18, 2021

(65) Prior Publication Data
US 2022/0408488 A1 Dec. 22, 2022

(51) Int. Cl.
*H04W 4/00* (2018.01)
*H04W 72/044* (2023.01)
*H04W 74/00* (2009.01)
*H04W 74/0833* (2024.01)

(52) U.S. Cl.
CPC ..... *H04W 74/0833* (2013.01); *H04W 72/046* (2013.01); *H04W 74/002* (2013.01)

(58) Field of Classification Search
CPC .......... H04W 74/0833; H04W 72/046; H04W 74/002
See application file for complete search history.

(56) References Cited

U.S. PATENT DOCUMENTS

| | | | |
|---|---|---|---|
| 11,178,696 B2* | 11/2021 | Kim | H04W 56/00 |
| 2018/0324716 A1* | 11/2018 | Jeon | H04W 74/0833 |
| 2018/0324853 A1* | 11/2018 | Jeon | H04W 74/08 |
| 2018/0368189 A1 | 12/2018 | Narasimha et al. | |
| 2019/0069258 A1* | 2/2019 | Jeon | H04W 56/0045 |

(Continued)

FOREIGN PATENT DOCUMENTS

| CN | 108401297 A | * | 8/2018 | ...... H04B 7/0617 |
|---|---|---|---|---|
| CN | 109963350 A | | 7/2019 | |

(Continued)

OTHER PUBLICATIONS

Office Action and Search Report for Chinese Application No. 201980100285.7, mailed on Dec. 5, 2023, 11 pages.

(Continued)

*Primary Examiner* — Thai Dinh Hoang
(74) *Attorney, Agent, or Firm* — Brake Hughes Bellermann LLP

(57) ABSTRACT

A method comprises causing a message to be transmitted from a communications device to a transmission reception point during a random access procedure. The message comprises information identifying a plurality of different beam directions. The method further comprises receiving a (Continued)

response to the message from a plurality of different beam directions.

15 Claims, 16 Drawing Sheets

(56) References Cited

U.S. PATENT DOCUMENTS

| | | | |
|---|---|---|---|
| 2019/0110314 A1* | 4/2019 | Abedini | H04L 5/0078 |
| 2019/0182800 A1 | 6/2019 | Park et al. | |
| 2019/0182817 A1* | 6/2019 | Agiwal | H04B 7/0617 |
| 2019/0208549 A1* | 7/2019 | Zhang | H04W 74/0833 |
| 2019/0268947 A1 | 8/2019 | Zhang et al. | |
| 2020/0296765 A1* | 9/2020 | Kim | H04W 72/0446 |
| 2022/0070940 A1* | 3/2022 | Taherzadeh Boroujeni | H04L 5/0044 |
| 2022/0408488 A1* | 12/2022 | Deghel | H04W 74/0833 |

FOREIGN PATENT DOCUMENTS

| | | | | |
|---|---|---|---|---|
| WO | WO-2019031671 A1 * | 2/2019 | | H04W 48/12 |
| WO | 2019096679 A1 | 5/2019 | | |
| WO | WO-2023211331 A1 * | 11/2023 | | |

OTHER PUBLICATIONS

Examination Report for India Application No. 202247021118, mailed on Aug. 19, 2022, 7 pages.
Second Office Action for Chinese Application No. 201980100285.7, mailed on May 1, 2024, 12 pages.
International Search Report and Written Opinion for International Application No. PCT/EP2019/074488; mailed on Jun. 8, 2020, 15 pages.
3GPP TSG-RAN WG2 Meeting #107, R2-1908693 (revision of R2-1905655); "Discussion on the MsgA Resource Selection"; Source: Vivo; Agenda Item: 11.13.4; Prague, Czech Republic; Aug. 26-30, 2019; 8 pages.
3GPP TSG-RAN WG2 Meeting #107, R2-1908772; "RACH Initialization and Resource Selection for 2-Step RACH"; Source: OPPO; Agenda Item: 11.13.5; Prague, Czech Republic; Aug. 26-30, 2019, 4 pages.
Communication pursuant to Article 94(3) for European Patent Application No. 19770023.0, mailed on Dec. 12, 2024, 8 pages.
Third Office Action for Chinese Application No. 201980100285.7, mailed on Sep. 20, 2024, 11 pages.

* cited by examiner

APPARATUS, METHOD, AND COMPUTER PROGRAM

CROSS-REFERENCE TO RELATED APPLICATIONS

This application is a national stage entry of International Application No. PCT/EP2019/074488, filed Sep. 13, 2019, entitled "APPARATUS, METHOD, AND COMPUTER PROGRAM" which is hereby incorporated by reference in its entirety.

FIELD OF THE DISCLOSURE

The present disclosure relates to an apparatus, a method, and a computer program and in particular but not exclusively for apparatus, methods and computer programs for use in random access procedures.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided a method comprising: causing a message to be transmitted from a communications device to a transmission reception point during a random access procedure, said message comprising information identifying a plurality of different beam directions; and receiving a response to said message from a plurality of different beam directions.

The method may comprise receiving reference beam signals from one or more transmission reception points.

The reference beam signals may comprise synchronization signal block beams.

The method may comprise determining a plurality of preferred beam directions, said information identifying said preferred beam directions.

The information may comprise one or more of a beam identity of a respective preferred beam direction and a cell identity associated with a respective beam.

The message may be a MsgA message.

The response may be a MsgB message.

The information identifying the plurality of beam directions may be provided: as part of uplink control information; as part of one or more media access control control elements); using a preamble index; and/or using a physical random access channel occasion.

The method may comprise receiving said response from the plurality of different beam directions substantially at the same time.

The method may comprise receiving said response from the plurality of different beam directions at different times.

The method may comprise combining said response received from the plurality of different beam directions.

The method may comprise receiving configuration information indicating one or more of: a number of beam directions to be identified in said message; and a number of transmission reception points from which one or more beam directions are to be identified in said message.

The method may be performed by an apparatus. The apparatus may be in a communications device or be a communications device.

According to another aspect, there is provided a method comprising: receiving a message for a transmission reception point during a random access procedure, said message being from a communications device and comprising information identifying a plurality of different beam directions; and causing a response to said message to be transmitted from a plurality of different beam directions.

The method may comprise causing a plurality of reference beam signals to be transmitted to said communications device.

The reference beam signals may comprise synchronization signal block beams.

The information may comprise one or more of a beam identity of a respective preferred beam direction and a cell identity associated with a respective beam.

The message may be a MsgA message.

The response may be a MsgB message.

The information identifying the plurality of beam directions may be provided: as part of uplink control information; as part of one or more media access control control elements; using a preamble index; using a physical random access channel occasion.

The method may comprise causing configuration information to be transmitted to said communications device, said configuration information indicating one or more of: a number of beam directions to be identified in said message; and a number of transmission reception points from which one or more beam directions are to be identified in said message.

The method may comprise causing a request to be transmitted to a further transmission reception point to request that said further transmission reception point transmit said response in at least one of said plurality of different beam directions.

The request may comprise beam information indicating said at least one of said plurality of different beam directions.

The method may comprise receiving a message from the further transmission reception point, said message comprising information indicating whether or not said response has been successfully transmitted from said further transmission reception point.

The method may be performed by an apparatus. The apparatus may be provided in a transmission reception point or be a transmission reception point.

According to another aspect there is provided a method comprising: receiving a request from a transmission reception point to request that a further transmission reception point transmit a random access response message in at least one beam direction to a communications device, said request comprising information identifying said at least one beam direction; and causing said random access response message to be transmitted from said at least one beam direction.

The random access response message may be a MsgB message.

The method may comprise causing a message to be transmitted from the further transmission reception point to the transmission reception point, said message comprising information indicating whether or not said random access response message has been successfully transmitted from said further transmission reception point.

The method may be performed by an apparatus. The apparatus may be provided in a transmission reception point or be a transmission reception point.

According to another aspect, there is provided an apparatus comprising means for: causing a message to be transmitted from a communications device to a transmission reception point during a random access procedure, said message comprising information identifying a plurality of different beam directions; and receiving a response to said message from a plurality of different beam directions.

The means may be for receiving reference beam signals from one or more transmission reception points.

The reference beam signals may comprise synchronization signal block beams.

The means may be for determining a plurality of preferred beam directions, said information identifying said preferred beam directions.

The information may comprise one or more of a beam identity of a respective preferred beam direction and a cell identity associated with a respective beam.

The message may be a MsgA message.

The response may be a MsgB message.

The information identifying the plurality of beam directions may be provided: as part of uplink control information; as part of one or more media access control elements; using a preamble index; and/or using a physical random access channel occasion The means may be for receiving said response from the plurality of different beam directions substantially at the same time.

The means may be for receiving said response from the plurality of different beam directions at different times.

The means may be for combining said response received from the plurality of different beam directions.

The means may be for receiving configuration information indicating one or more of: a number of beam directions to be identified in said message; and a number of transmission reception points from which one or more beam directions are to be identified in said message.

The apparatus may be in a communications device or be a communications device.

According to another aspect, there is provided an apparatus comprising means for: receiving a message for a transmission reception point during a random access procedure, said message being from a communications device and comprising information identifying a plurality of different beam directions; and causing a response to said message to be transmitted from a plurality of different beam directions.

The means may be for causing a plurality of reference beam signals to be transmitted to said communications device.

The reference beam signals may comprise synchronization signal block beams.

The information may comprise one or more of a beam identity of a respective preferred beam direction and a cell identity associated with a respective beam.

The message may be a MsgA message.

The response may be a MsgB message.

The information identifying the plurality of beam directions may be provided: as part of uplink control information; as part of one or more media access control (MAC) control elements (CEs); using a preamble index; and/or using a physical random access channel occasion.

The means may be for causing configuration information to be transmitted to said communications device, said configuration information indicating one or more of: a number of beam directions to be identified in said message; and a number of transmission reception points from which one or more beam directions are to be identified in said message.

The means may be for causing a request to be transmitted to a further transmission reception point to request that said further transmission reception point transmit said response in at least one of said plurality of different beam directions.

The request may comprise beam information indicating said at least one of said plurality of different beam directions.

The means may be for receiving a message from the further transmission reception point, said message comprising information indicating whether or not said response has been successfully transmitted from said further transmission reception point.

The apparatus may be provided in a transmission reception point or be a transmission reception point.

According to another aspect, there is provided an apparatus comprising means for: receiving a request from a transmission reception point to request that a further transmission reception point transmit a random access response message in at least one beam direction to a communications device, said request comprising information identifying said at least one beam direction; and causing said random access response message to be transmitted from said at least one beam direction.

The random access response message may be a MsgB message.

The means may be for causing a message to be transmitted from the further transmission reception point to the transmission reception point, said message comprising information indicating whether or not said random access response message has been successfully transmitted from said further transmission reception point.

The apparatus may be provided in a transmission reception point or be a transmission reception point.

According to another aspect, there is provided an apparatus comprising at least one processor and at least one memory including computer code for one or more programs, the at least one memory and the computer code configured, with the at least one processor, to cause the apparatus at least to: cause a message to be transmitted from a communications device to a transmission reception point during a random access procedure, said message comprising information identifying a plurality of different beam directions; and receive a response to said message from a plurality of different beam directions.

The at least one memory and the computer program code may be configured to, with the at least one processor, cause the apparatus at least to receive reference beam signals from one or more transmission reception points.

The reference beam signals may comprise synchronization signal block beams.

The at least one memory and the computer program code may be configured to, with the at least one processor, cause the apparatus at least to determine a plurality of preferred beam directions, said information identifying said preferred beam directions.

The information may comprise one or more of a beam identity of a respective preferred beam direction and a cell identity associated with a respective beam.

The message may be a MsgA message.

The response may be a MsgB message.

The information identifying the plurality of beam directions may be provided: as part of uplink control information; as part of one or more media access control elements; using a preamble index; and/or using a physical random access channel occasion.

The at least one memory and the computer program code may be configured to, with the at least one processor, cause the apparatus at least to receive said response from the plurality of different beam directions substantially at the same time.

The at least one memory and the computer program code may be configured to, with the at least one processor, cause the apparatus at least to receive said response from the plurality of different beam directions at different times.

The at least one memory and the computer program code may be configured to, with the at least one processor, cause the apparatus at least to combine said response received from the plurality of different beam directions.

The at least one memory and the computer program code may be configured to, with the at least one processor, cause the apparatus at least to receive configuration information indicating one or more of: a number of beam directions to be identified in said message; and a number of transmission reception points from which one or more beam directions are to be identified in said message.

The apparatus may be in a communications device or be a communications device.

According to another aspect, there is provided an apparatus comprising at least one processor and at least one memory including computer code for one or more programs, the at least one memory and the computer code configured, with the at least one processor, to cause the apparatus at least to: receive a message for a transmission reception point during a random access procedure, said message being from a communications device and comprising information identifying a plurality of different beam directions; and cause a response to said message to be transmitted from a plurality of different beam directions.

The at least one memory and the computer program code may be configured to, with the at least one processor, cause the apparatus at least to cause a plurality of reference beam signals to be transmitted to said communications device.

The reference beam signals may comprise synchronization signal block beams.

The information may comprise one or more of a beam identity of a respective preferred beam direction and a cell identity associated with a respective beam.

The message may be a MsgA message.

The response may be is a MsgB message.

The information identifying the plurality of beam directions may be provided: as part of uplink control information; as part of one or more media access control (MAC) control elements (CEs); using a preamble index; and/or using a physical random access channel occasion.

The at least one memory and the computer program code may be configured to, with the at least one processor, cause the apparatus at least to cause configuration information to be transmitted to said communications device, said configuration information indicating one or more of: a number of beam directions to be identified in said message; and a number of transmission reception points from which one or more beam directions are to be identified in said message.

The at least one memory and the computer program code may be configured to, with the at least one processor, cause the apparatus at least to cause a request to be transmitted to a further transmission reception point to request that said further transmission reception point transmit said response in at least one of said plurality of different beam directions.

The request may comprise beam information indicating said at least one of said plurality of different beam directions.

The at least one memory and the computer program code may be configured to, with the at least one processor, cause the apparatus to receive a message from the further transmission reception point, said message comprising information indicating whether or not said response has been successfully transmitted from said further transmission reception point.

The apparatus may be provided in a transmission reception point or be a transmission reception point.

According to another aspect, there is provided an apparatus comprising at least one processor and at least one memory including computer code for one or more programs, the at least one memory and the computer code configured, with the at least one processor, to cause the apparatus at least to: receive a request from a transmission reception point to request that a further transmission reception point transmit a random access response message in at least one beam direction to a communications device, said request comprising information identifying said at least one beam direction; and cause said random access response message to be transmitted from said at least one beam direction.

The random access response message may be a MsgB message.

The at least one memory and the computer program code may be configured to, with the at least one processor, cause the apparatus to cause a message to be transmitted from the further transmission reception point to the transmission reception point, said message comprising information indicating whether or not said random access response message has been successfully transmitted from said further transmission reception point.

The apparatus may be provided in a transmission reception point or be a transmission reception point.

According to an aspect there is provided a computer program comprising computer executable code which when run on at least one processor is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which.

DETAILED DESCRIPTION OF THE FIGURES

As is known, wireless systems can be divided into cells, and are therefore often referred to as cellular systems. Typically, an access point such as a base station provides at least one cell. The cellular system can support communications between user equipment (UE). The present disclosure relates to cellular radio implementation, including 2G, 3G, 4G, and 5G radio access networks (RANs); cellular internet of things (IoT) RAN; and cellular radio hardware.

In the following certain embodiments are explained with reference to communications devices capable of communication via a wireless cellular system and communication systems serving such communications devices. Before explaining in detail the exemplifying embodiments, certain general principles of a wireless communication system, access systems thereof, and communications devices are briefly explained with reference to FIGS. 7 to 11 to assist in understanding the technology underlying the described examples.

An example of wireless communication systems are architectures standardized by the 3rd Generation Partnership Project (3GPP). A latest 3GPP based development is often referred to as 5G or New Radio (NR). Other examples of radio access system comprise those provided by base stations of systems that are based on technologies such as wireless local area network (WLAN) and/or WiMAX (Worldwide Interoperability for Microwave Access). It should be appreciated that although some embodiments are described in the context of a 5G system, other embodiments may be provided in any other suitable system including but not limited to subsequent systems or similar protocols defined outside the 3GPP forum.

Figure 7:
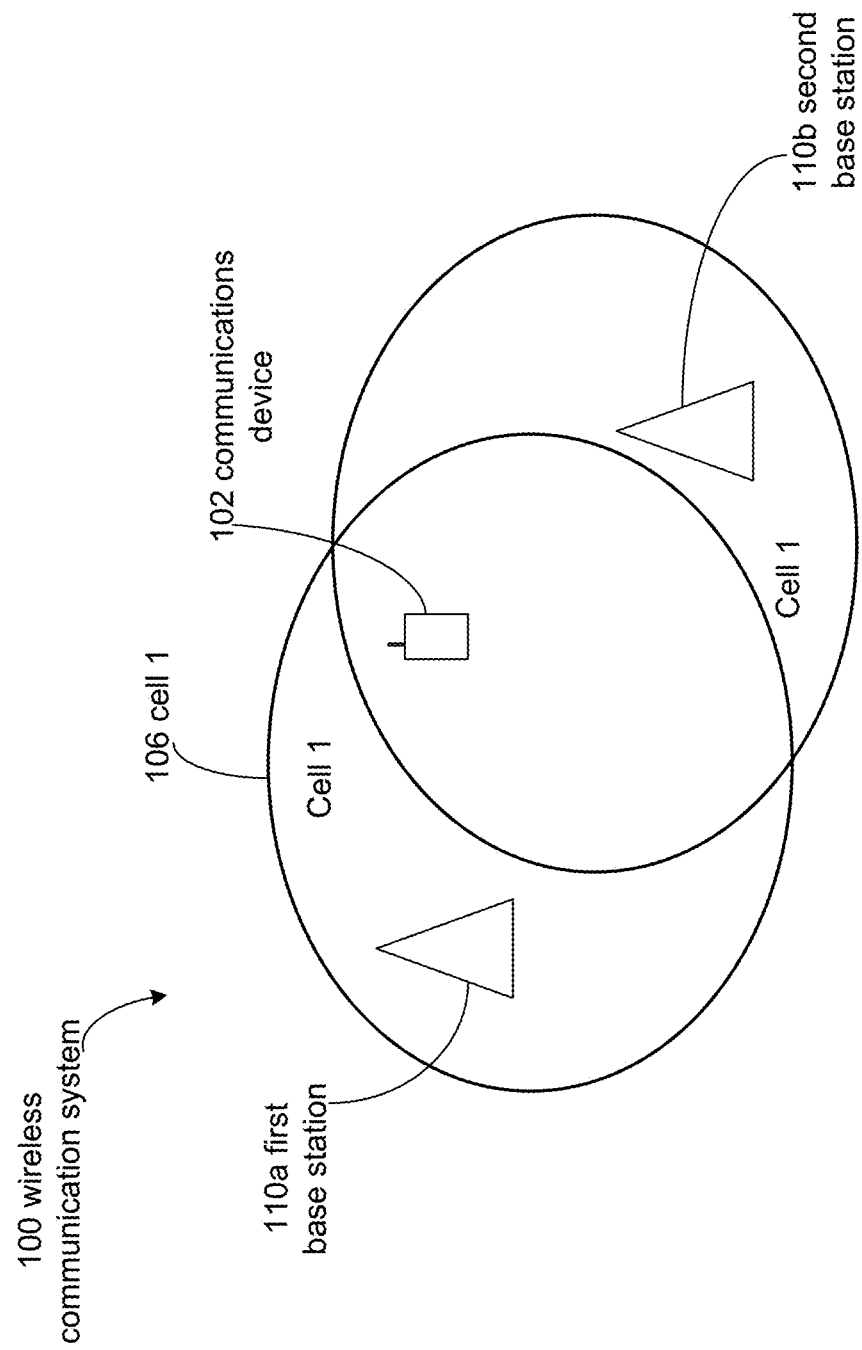
FIG. 7 shows a schematic diagram of an example communication system comprising a plurality of base stations and a communication device.

FIG. 7 which shows a section of a wireless communication system 100. As can be seen a communications device 102 are served by cell 1 106 which is provided by a first base station 110a. In this example, the communications device 102 may be served by a second cell, cell 2, which is provided by a second base station 110b. The base station may be any suitable transmission reception point TRP depending on the system. For example, the TRP (sometimes referring as TRxP) may be a gNB or a ng-eNB or provided by a gNB or a ng-eNB.

The communication devices will be referred to as a UE (user equipment) in this document but it should be appreciated that the device may be any suitable communications device and the term UE is intended to cover any such device. Some examples of communications devices are discussed below and as used in this document the term UE is intended to cover any one or more of those devices and/or any other suitable device. The communications devices have a wireless connection to a base station or other suitable TRP.

Figure 8:
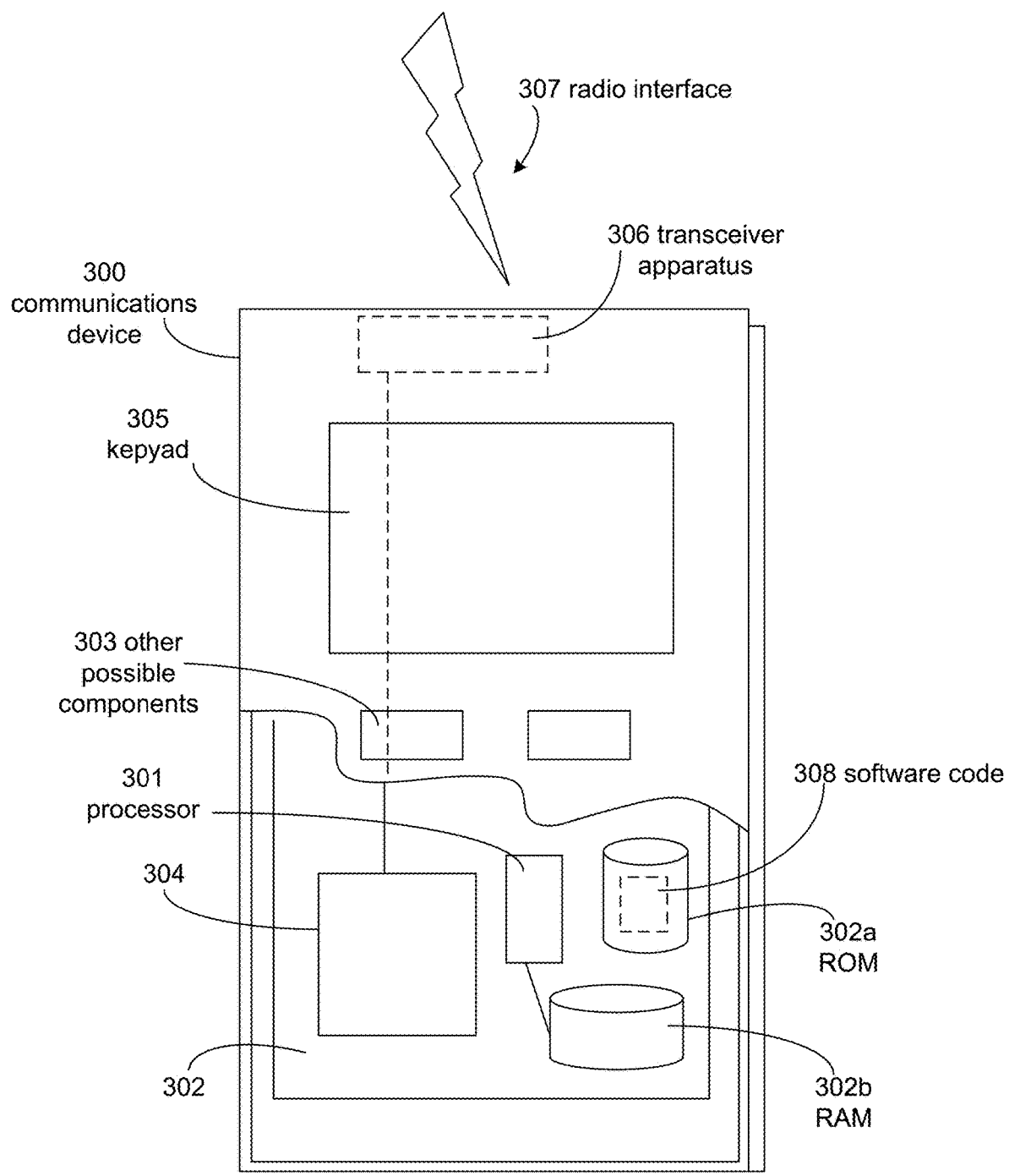
FIG. 8 shows a schematic diagram of an example mobile communication device.

FIG. 8 illustrates an example of a communications device 300, such as the wireless communications device 102 shown on FIG. 7. The wireless communications device 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like.

The device 300 may receive signals over an air or radio interface 307 via appropriate apparatus for receiving and may transmit signals via appropriate apparatus for transmitting radio signals. In FIG. 8 transceiver apparatus is designated schematically by block 306. The transceiver apparatus 306 may be provided for example by means of a radio part and associated antenna arrangement. The antenna arrangement may be arranged internally or externally to the mobile device.

The wireless communications device 300 may be provided with at least one processor 301 and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 302a.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like.

Optionally one or more of a display, a speaker and a microphone may be provided depending on the type of the device.

Communication protocols and/or parameters which shall be used for the connection are also typically defined. The communications devices may access the communication system based on various access techniques.

Figure 9:
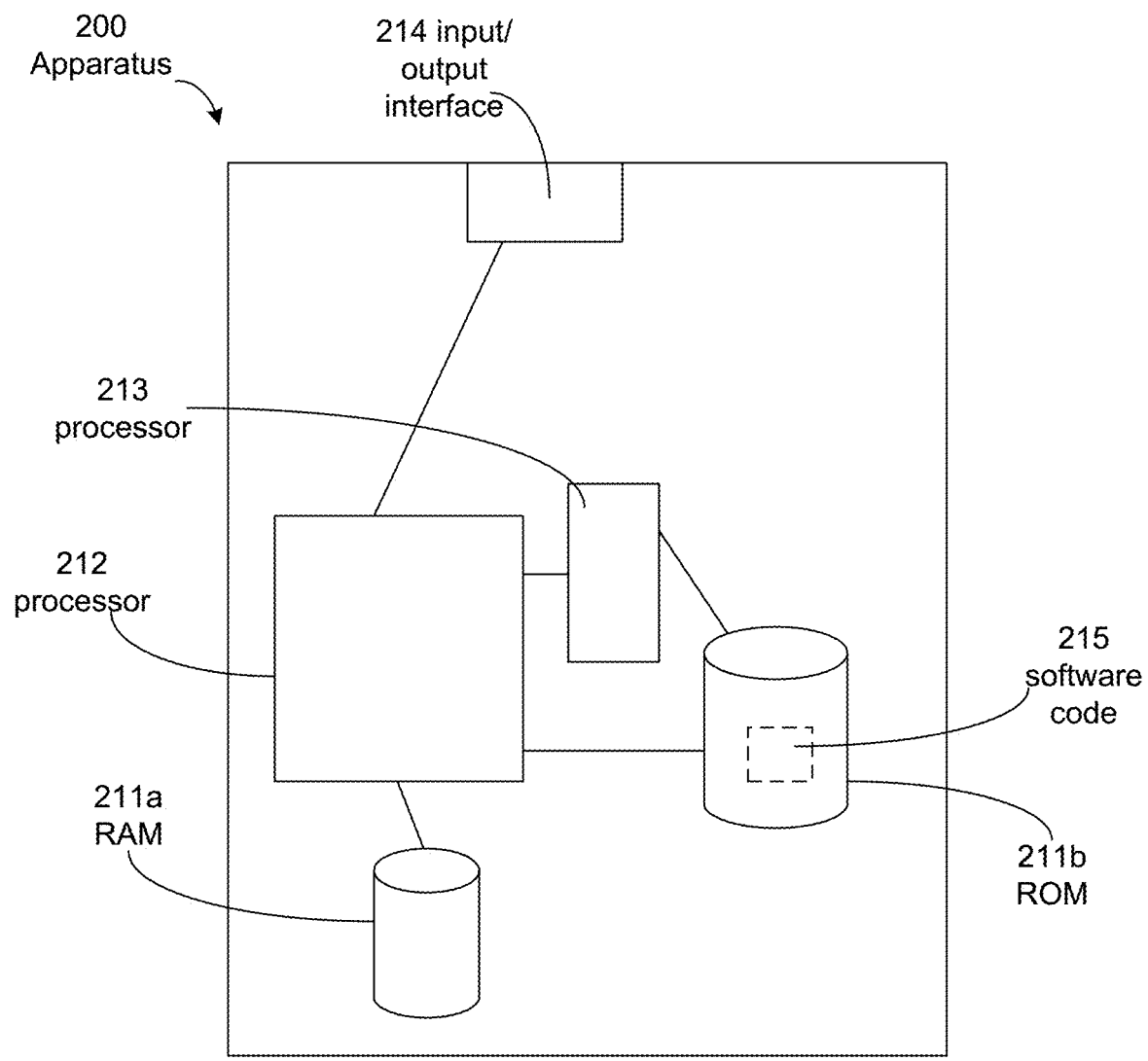
FIG. 9 shows a schematic diagram of an example apparatus provided in a base station.

An example apparatus is shown in FIG. 9. FIG. 9 shows an example of an apparatus 200 for a base station. The apparatus comprises at least one memory. The at least one memory may be at least one random access memory (RAM) 211a and/or at least one read only memory (ROM) 211b, at least one processor 212, 213 and an input/output interface 214. The at least one processor 212, 213 is coupled to the RAM 211a and the ROM 211b. The at least one processor 212, 213 may be configured to execute an appropriate software code 215 to implement one or more of the following aspects. The software code 215 may be stored in the ROM 211b.

Figure 10:
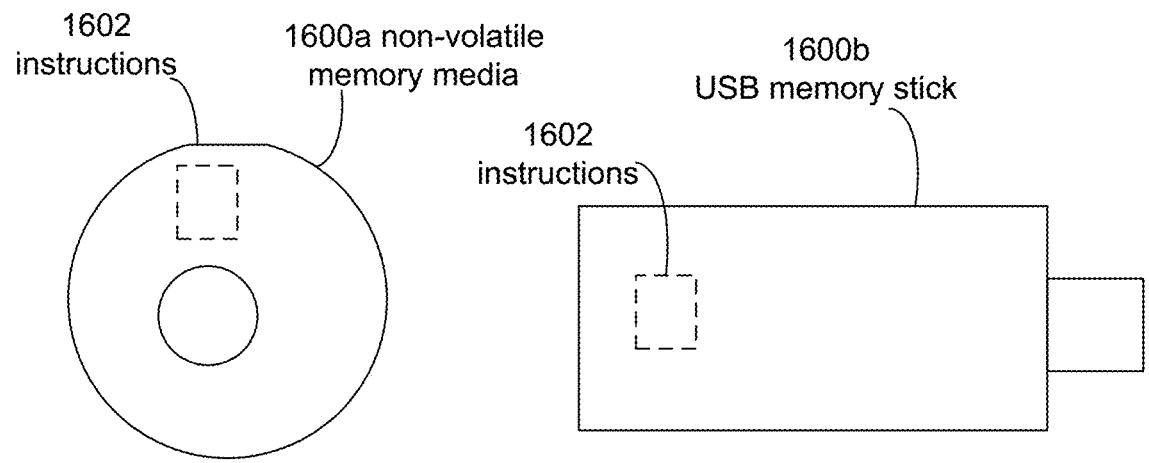
FIG. 10 shows a schematic representation of a non-volatile memory medium storing instructions which when executed by a processor allow a processor to perform one or more of the steps of the method of some embodiments.

FIG. 10 shows a schematic representation of non-volatile memory media 1600a (e.g. computer disc (CD) or digital versatile disc (DVD)) and 1600b (e.g. universal serial bus (USB) memory stick) storing instructions and/or parameters 1602 which when executed by a processor allow the processor to perform one or more of the steps of any of the methods of any of the embodiments.

Figure 11:
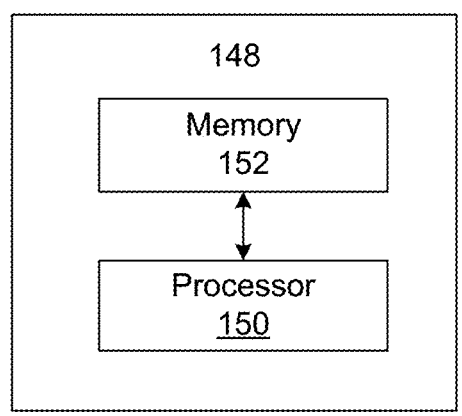
FIG. 11 shows an example apparatus which may be provided in a base station or a communications device.

FIG. 11 shows an apparatus 148. The apparatus 148 may be provided in a TRP or in a communications device. The apparatus may comprise at least processor 150 and at least one memory 152 including computer code for one or more programs.

This apparatus may be configured to cause some embodiments to be performed.

One or more of the following aspects relate to a 5G system (5GS). (5G is sometimes referred to as new radio (NR)). However, it will be understood that some of these aspects may be used with any other suitable radio access technology systems such as UTRAN (3G radio), the long-term evolution (LTE) of the Universal Mobile Telecommunications System (UMTS) and/or any other suitable system.

Figure 1:
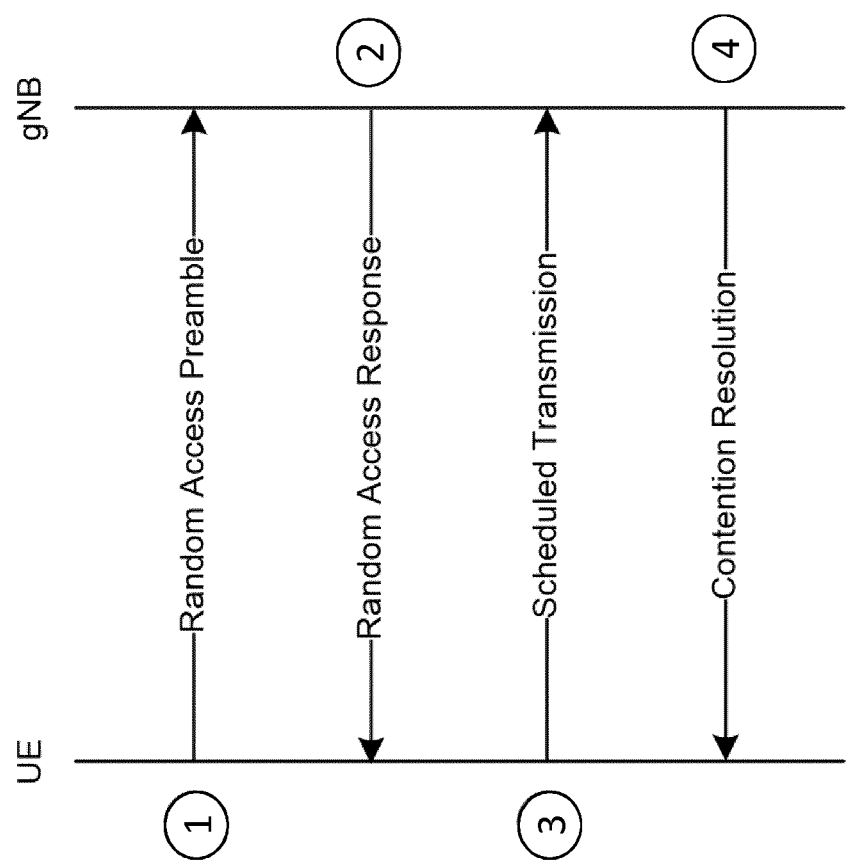
FIG. 1 illustrates an example of a 4-step RACH procedure.

FIG. 1 shows a schematic representation of a signalling diagram of a four step RACH (random access channel procedure). This procedure may be supported in NR.

In step 1, a UE may select a RACH preamble out of a configured set of RACH preambles. The UE may transmit the RACH preamble in one of a plurality of pre-determined RACH occasions.

In step 2, a gNB may send a Random Access Response (RAR). The RAR may be generated by Medium Access Control (MAC) layer. The RAR may provide at least one of a timing advance, initial UL grant to send a message 3 (Msg3) and an assignment of temporary Cell-Radio Network Temporary Identifier (C-RNTI).

In step 3, using the UL grant provided in RAR, the UE may send the Msg 3 to the gNB. The content for Msg3 may depend on whether the UE performs initial access (Msg 3 may comprise an RRCSetupRequest), RRC re-establishment (Msg 3 may comprise RRCReestablishment), handover (Msg 3 may comprise RRCReconfigurationComplete) or beam failure recovery (Msg 3 may comprise C-RNTI MAC CE). This may for example be as set out in 3GPP TS 38.331 (Release 15).

In step 4, contention resolution may be performed in message 4 (Msg4). In the event that the UE loses the contention (e.g. due to a possible collision in RACH preamble transmissions with another UE), the UE may repeat the RACH procedure.

It has been proposed to provide a 2-step RACH for NR. The 2-step RACH procedure may have benefits for channel access and/or for enhancing the connection setup/resume procedure.

Figure 2:
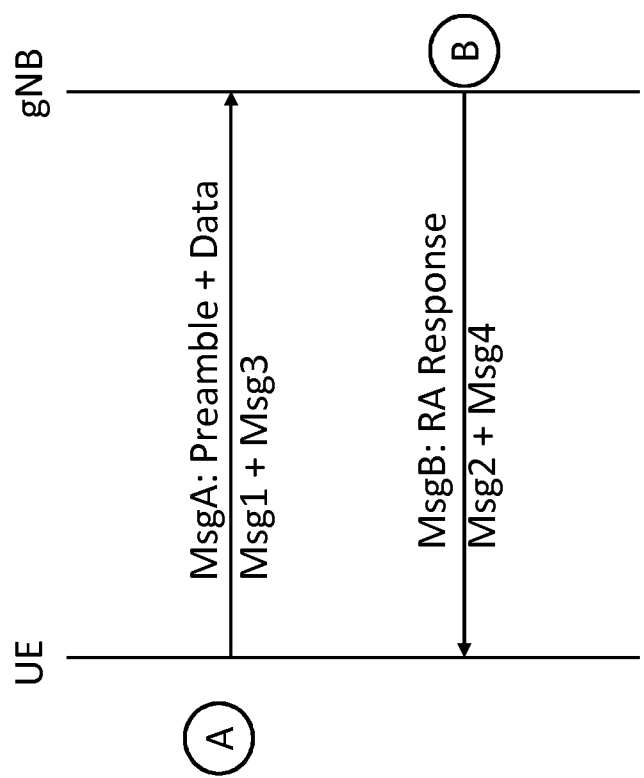
FIG. 2 illustrates an example of a 2-step RACH procedure.

In 2-step RACH, a first message, MsgA, combines the preamble signal (Msg1) and the data signal (Msg3), and a second message, MsgB combines the random-access response (Msg2) and the contention resolution (Msg4). In this regard reference is made to FIG. 2.

In step A, the UE transmits MsgA to the gNB.

In step B, the gNB transmits MsgB to the UE.

In some embodiment, the events triggering 2-step RACH procedure may be the same as those for triggering the 4-step RACH procedure.

By way of example only, an event which may trigger a RACH procedure may comprise one or more of the following events:

initial access from an idle mode such as an RRC (radio resource control) idle mode;

a connection re-establishment procedure such a RRC connection re-establishment procedure;

DL (downlink) or UL (uplink) data arrival during a connected mode when the UL synchronisation status is "non-synchronised". The connected mode may be a RRC connected mode;

UL data arrival during a connected mode when there are no uplink control channel resources for SR (scheduling request) available. The connected mode may be a RRC connected mode. The uplink control channel may be a PUCCH (physical uplink control channel);

SR failure;

a request upon synchronous reconfiguration (e.g. handover). The request may be a RRC request;

a transition from an inactive mode. The inactive mode may be a RRC inactive mode;

to establish time alignment at a secondary cell (SCell) addition; and beam failure recovery.

This is by way of example only and in other embodiments one or more other events may trigger a RACH procedure.

Figure 3:
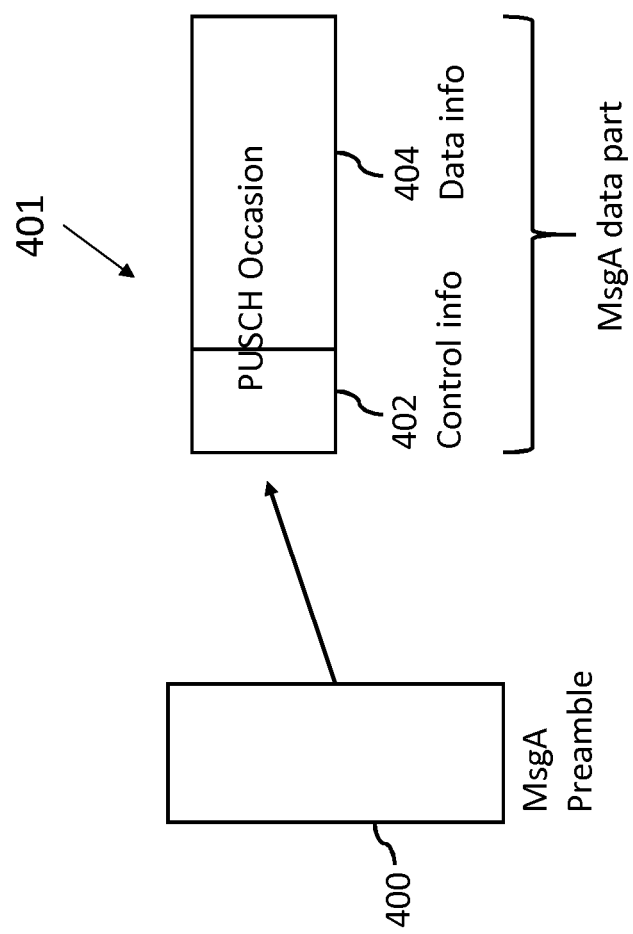
FIG. 3 shows an example of a PUSCH (physical uplink shared channel) occasion with control and data resource elements.

Reference is made to FIG. 3 which shows an example of a PUSCH occasion with control and data resource elements for MsgA.

In some embodiments, for MsgA, there may be support for one-to-one and multiple-to-one mapping between the preambles in each RO (RACH occasion) and the associated PUSCH resource unit. To improve the probability of successful decoding of the MsgA at the gNB, the UE may for example select different modulation and coding schemes (MCS) depending on the measured channel conditions. However, a multiple decode scenario at the gNB may increase the complexity of the gNB receiver. To avoid this, the uplink control information (UCI) may for example provide information to assist the gNB to decode the MsgA PUSCH transmission. This may be transmitted with the uplink data. The information may comprise information about one or more of the MCS used, the payload size, and the resource size, etc. This may reduce the amount of hypothesis testing required and/or subsequent risk of erroneous decoding.

In the example of FIG. 3, the MsgA comprises a preamble 400, and a PUSCH occasion for data part 401. The MsgA data part comprises control information 402 (the UCI) and data information 404. This data information is the actual data being sent on MsgA.

In NR, with beam-based operation, there is an association of the different synchronization signal block (SSB) time indices with different ROs (in time and/or frequency) and/or different preambles. Since different SSB time indices correspond to SSB transmissions in different downlink beams, based on the detected preamble, the network will be able to determine a best beam for the user equipment which has transmitted the respective preamble. This may be an implicit indication of a preferred beam from the UE side through the preamble transmission. The network may then use this beam for downlink transmissions to this user equipment.

Figure 4:
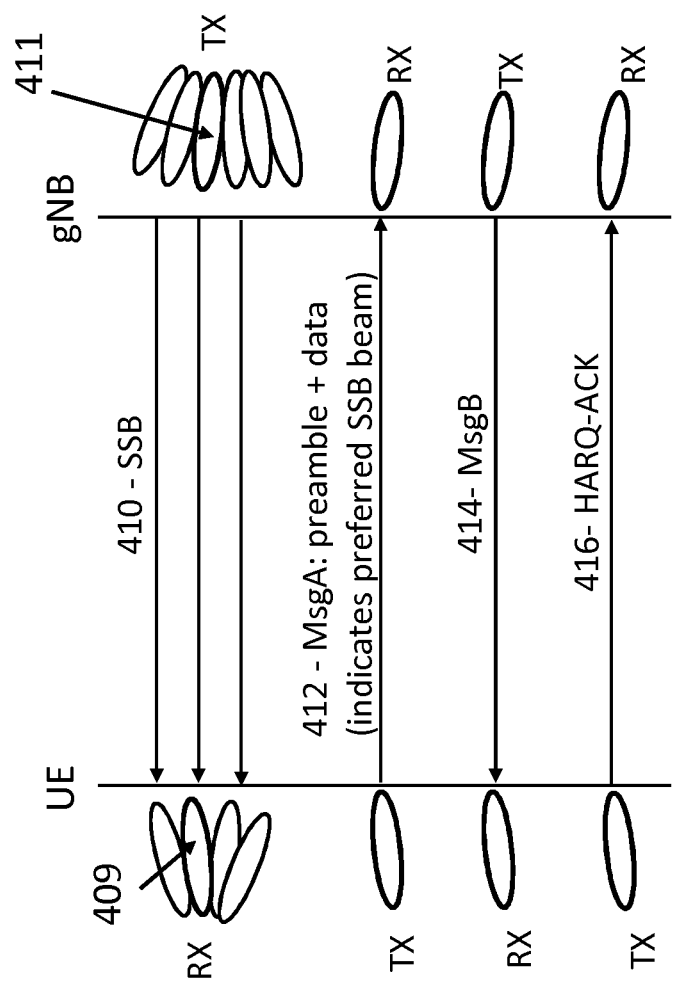
FIG. 4 shows an example of 2-step RACH procedure with beamforming.

Reference is made to FIG. 4 which shows an example of 2-step RACH procedure with beamforming.

As shown in FIG. 4, in step 410, the gNB is configured to transmit to the UE several SSBs on different transmission beams.

Based on the received transmission beams, the UE determines which one of the received beams is the best received beam. In this example, that best received beam is referenced 409. The corresponding transmit beam on the gNB side is referenced 411.

In the next step 412, the UE transmits on the transmit beam corresponding to the best received beam. The UE transmits MsgA with its preamble and data. The UE also indicated its preferred SSB. The gNB receives the MsgA on the receive beam corresponding to the transmit beam referenced 411.

In step 414, the gNB transmits MsgB to the UE using the beam referenced 411. The UE receives MsgB on the beam referenced 409.

In step 416, the UE transmits on the transmit beam used in step 412. The UE transmits a HARQ-ACK (hybrid automatic repeat request acknowledgment). The gNB receives the HARQ-ACK on the receive beam of step 412.

Thus, using the 2-step RACH procedure, UE sends a preamble on a RO associated with its selected SSB beam. By assuming beam correspondence, MsgA and MsgB will then be transmitted/received on the selected beam. One feature of using 2-step RACH may be to shorten the latency of the random-access procedure.

In some embodiments, it may be desirable to send MsgA and/or MsgB (and its corresponding HARQ-ACK) in a relatively fast and/or relatively reliable manner. This may be useful for example in critical use cases of random access and/or other scenarios.

The reliability of the MsgB may be impacted by one or more factors. This may have an adverse effect on the latency. There are a number of different scenarios where this may arise. The following are some examples of scenarios which may arise. By way of example, a scenario may arise where after sending MsgA, a misalignment or blockage occurs on the selected SSB beam. Another example scenario may occur where the channel quality of the selected SSB is not good enough. In these scenarios, a MsgB and/or corresponding HARQ-ACK may not be received correctly. This may lead to retransmitting the MsgB multiple times and/or the UE might need to start RACH procedure from the beginning. This may be undesirable in terms of latency and/or resource efficiency. If a UE does not receive the MsgB, the UE will need to retransmit MsgA. This may increase the power consumption of the UE and/or the network interference.

Some embodiments may improve the reliability and/or latency of the MsgB for a 2-step RACH procedure.

One or more of the options described may be used in conjunction with 4-step RACH procedure. For example, the preferred beam/TRP information may be included in Msg 3. Msg 4 may be sent over two or more beams for better reliability.

In some embodiments, the UE is configured to inform the network not just about the preferred/best beam from one TRP (transmission reception point) but also about the preferred/best beam(s) from one or more secondary TRP(s).

In some embodiments, the UE is alternatively or additionally configured to inform the network about a plurality of preferred/best beams from one TRP (transmission reception point).

This may be provided by the MsgA. The network may use this information in order to increase the reliability of the MsgB transmission by for instance transmitting the MsgB from one or more other TRPs and not just from only one TRP, or by using different beams from the same TRP.

In some embodiments, the UE will include in the MsgA transmission information about its preferred/best beam and information about one or more other suitable beams. That may be from the same TRP as the best beam and/or the best/preferred beam from one or more other secondary TRP(s).

The beam selection may be based on DL RSs (reference signals) from the one or more candidate TRPs.

Any suitable technique may be used to determine which beams are the preferred or best beams from different primary and secondary TRPs.

If the other TRP(s) is in the same cell, then the beam ID may be signalled on the physical resources associated with the best TRP. If the one or more other TRPs are in different cells, then beam ID and the cell ID are signalled to the best TRP. As one example, the beam ID could be in the form of SSB index.

This information, for example the beam ID or beam ID with cell ID, may be carried in MsgA.

The information may be carried in the MsgA as part of the uplink control information (UCI). In this case, one or more control field may be provided for this purpose.

Alternatively or additionally, the information may be carried in the MsgA as part of one or more media access control (MAC) control elements (CEs). In this case, a MAC control element(s) is defined for this or elements with an existing MAC CE may be defined.

Alternatively or additionally, the information may be carried in the MsgA using a preamble index. With this approach, there may be partitioning of the preamble space in such a way that the choice of preamble index is for instance associated with the beam ID from one or more other TRP(s). To indicate a cell ID in case that the TRP is in a different cell, a different preamble index subset may be used. In this case the mapping between preamble to the beam ID/cell ID may be known by the UE and gNB beforehand. For example, gNB can send such information in RRC messages or other broadcast/unicast messages.

Alternatively or additionally, the information may be carried using a PRACH (physical random access channel) Occasion (RO). In this case, the ROs associated with each SSB may be partitioned in such a way that the choice of the RO is for example associated with the beam ID from the respective TRP. To indicate cell ID in case of TRP in a different cell, one or more different ROs may be used.

After sending the MsgA, the UE starts monitoring for the reception of MsgB from the one or more TRP(s) on the corresponding reported beam(s).

After receiving MsgA, the best TRP can send a request to the one or more reported TRP(s) to send MsgB to the UE. Depending on one or more of the selected beams, the UE capability and the resource availability, the MsgB can then be sent from the different TRPs to the UE at the same time or at different time instances to achieve a diversity effect. In addition, MsgB could be sent to the UE from different beams of the same TRP as well.

In some embodiments, the network may control activating/deactivating/guiding the reporting of the beam and/or cell information.

Figure 5:
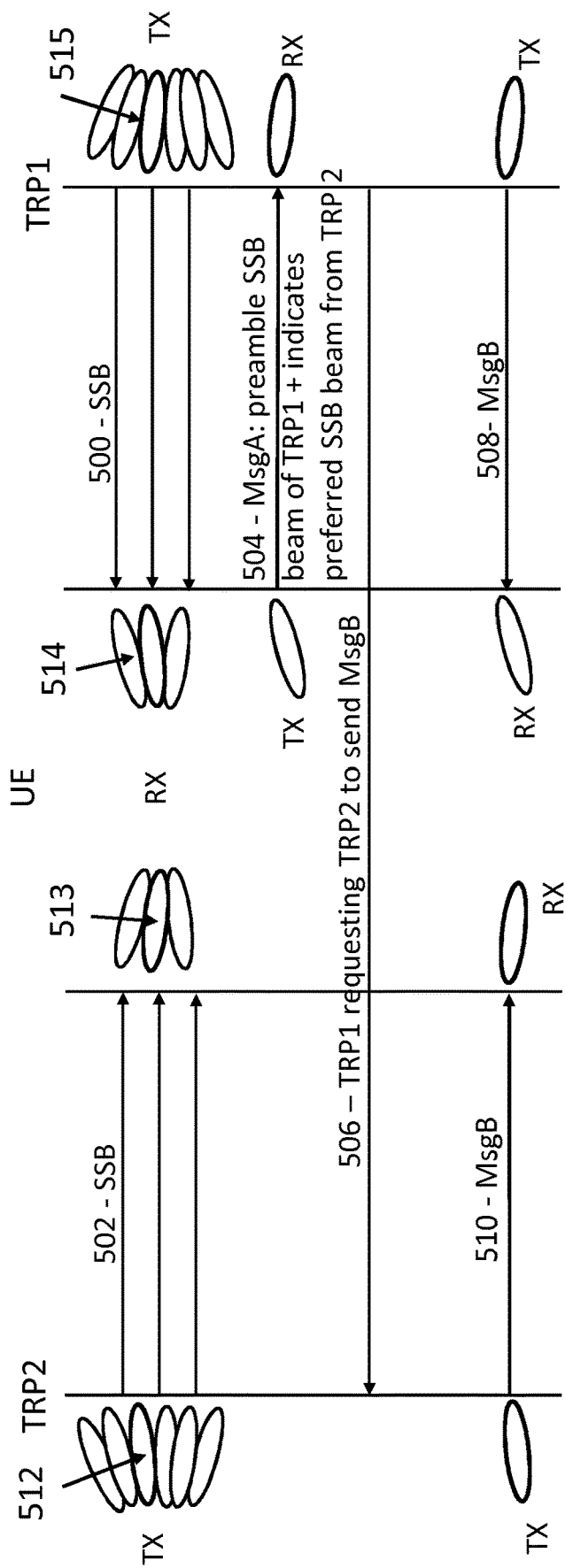
FIG. 5 shows a signal flow of some embodiments where the TRPs are in the same cell.

Reference is made to FIG. 5 which shows a signal flow of some embodiments where the TRPs are in the same cell.

In step 500 an apparatus of the first TRP, TRP1 is configured to cause the first TRP to transmit to the UE several SSBs on different transmission beams.

In step 502 an apparatus of the second TRP, TRP2 is configured to cause the second TRP to transmit to the UE several SSBs on different transmission beams.

Generally, step 500 and step 502 take place concurrently or more or less at the same time.

Based on the received transmission beams, an apparatus of the UE determines which ones of the received beams are the best received beam. In this example, the best received beam from the first TRP is referenced 514. The corresponding transmit beam on the TRP side is referenced 515. The best received beam from the second TRP is referenced 513. The corresponding transmit beam on the TRP side is referenced 512.

In the next step 504, an apparatus of the UE is configured to cause the UE to transmit to the first TRP on the transmit beam corresponding to the best/preferred received beam from that first TRP. The apparatus of the UE is configured to cause the UE to transmit MsgA with its preamble and data. In addition, information about the preferred SSB of the first TRP and the preferred SSB of the second TRP is provided.

The first TRP receives the MsgA with the preferred beam information on the receive beam corresponding to the transmit beam referenced 515.

In step 506, the apparatus of the first TRP is configured to cause a message to be transmitted from the first TRP to the second TRP. The message requests that the second TRP sends MsgB to the UE and provides information about the preferred SSB from the second TRP. The content of MsgB is sent from the first TRP to the second TRP as well which can be in the same request message or different message.

In step 508, the apparatus of the first TRP causes the TRP to transmit MsgB to the UE using the beam referenced 515 and which corresponds to the preferred SSB beam from the first TRP. The UE receives MsgB from the first TRP on the beam referenced 514.

In step 510, the apparatus of the second TRP causes the TRP to transmit MsgB to the UE using the beam referenced 512 and which corresponds to the preferred SSB beam from the second TRP. The UE receives MsgB from the second TRP on the beam referenced 513.

Step 508 and 510 may take place generally at the same time or at different time instances. This may be dependent on one or more of the selected beams, the UE capability and the resource availability.

Thus, the apparatus of the UE causes the UE to inform the first TRP, TRP1 through MsgA not just about the preferred beam from the first TRP but also about the preferred/best beam from the second TRP, TRP2.

In some embodiments, the beam selection may be based on DL RSs (Downlink reference signals) from those TRPs. It should be appreciated that any other suitable beam selection technique may alternatively or additionally be used.

The arrangement of FIG. 5 shows a scenario where the first and second TRPs are in the same cell. As such only the beam ID is required to be signalled to the first TRP to properly identify the beams associated with the second TRP. Otherwise, in addition to beam ID, a cell ID (of the second TRP) is also required to be signalled.

Figure 6:
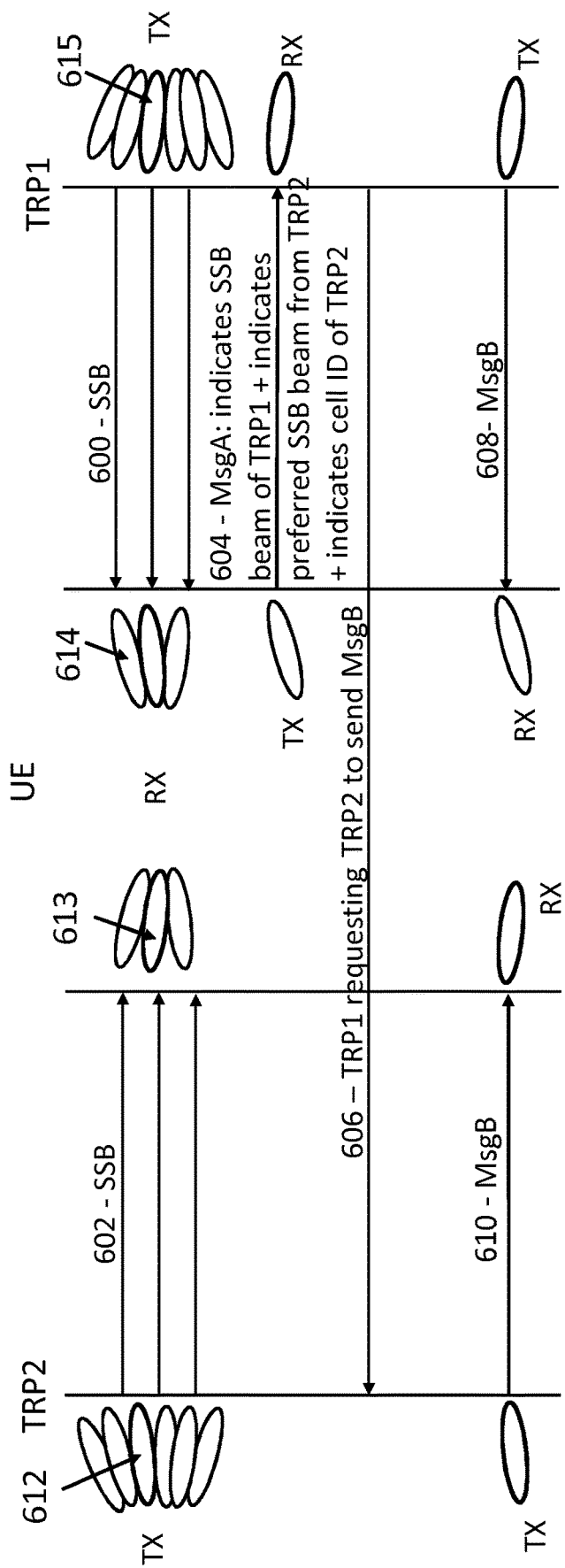
FIG. 6 shows a signal flow of some embodiments where the TRPs are in different cells.

Reference is made to FIG. 6 which shows a signal flow of some embodiments where the TRPs are in different cells.

In step 600 an apparatus of the first TRP, TRP1 is configured to cause the first TRP to transmit to the UE several SSBs on different transmission beams.

In step 602 an apparatus of the second TRP, TRP2 is configured to cause the second TRP to transmit to the UE several SSBs on different transmission beams.

Generally, step 600 and step 602 take place concurrently or more or less at the same time.

Based on the received transmission beams, an apparatus of the UE determines which ones of the received beams are the best/preferred received beam(s). In this example, the best received beam from the first TRP is referenced 614. The corresponding transmit beam on the TRP side is referenced 615. The best received beam from the second TRP is referenced 613. The corresponding transmit beam on the TRP side is referenced 612.

In the next step 604, an apparatus of the UE is configured to cause the UE to transmit to the first TRP on the transmit beam corresponding to the best received beam from that first TRP. The apparatus of the UE is configured to cause the UE to transmit MsgA with its preamble and data. In addition, information about the preferred SSB of the first TRP and the preferred SSB of the second TRP is provided along with the cell ID associated with the second TRP.

The first TRP receives the MsgA with the preferred beam information on the receive beam corresponding to the transmit beam referenced 615.

In step 606, the apparatus of the first TRP is configured to cause a message to be transmitted from the first TRP to the second TRP. The message requests that the second TRP sends MsgB to the UE and provides information about the preferred SSB from the second TRP. The cell ID is used by the apparatus to determine which TRP is the second TRP. The content of MsgB is sent from the first TRP to the second TRP as well which can be in the same request message or different message.

In step 608, the apparatus of the first TRP causes the TRP to transmit MsgB to the UE using the beam referenced 615 and which corresponds to the preferred SSB beam of the first TRP. The UE receives MsgB from the first TRP on the beam referenced 614.

In step 610, the apparatus of the second TRP causes the TRP to transmit MsgB to the UE using the beam referenced 612 and which corresponds to the preferred SSB beam of the second TRP. The UE receives MsgB from the second TRP on the beam referenced 613.

Step 608 and 610 may take place generally at the same time or at different time instances. This may be dependent on one or more of the selected beams, the UE capability and the resource availability.

In some embodiments, the beam ID or beam ID with cell ID, can be carried in MsgA. The beam ID or beam ID with cell ID may be carried as part of UCI, part of MAC CE, using a preamble index, or using PRACH occasion (RO).

After sending MsgA, the apparatus of the UE causes the UE to start monitoring for MsgB not just from TRP1 but also from TRP2 on the corresponding reported beam.

Some embodiments may allow a plurality of transmissions of MsgB from different TRPs or on different beams of the same TRP. In case one beam is blocked, the other one beam can be received.

Alternatively or additionally, some embodiments may have soft combining of the received MsgBs at the UE. This may be the case if the data is unicast to a single UE. This may provide advantages in terms of reliability and/or latency of receipt of the MsgB. This may mean that the 2-step RACH procedure may have relatively high reliability and/or the latency may be relatively short.

Some embodiments may have one or more advantages in the case where there is a high load on one of the TRPs. In the scenario where there is a relatively large number of UEs attempting access or sending data on a given TRP, there may be a relatively large number of MsgBs that need to be sent. In some embodiments an apparatus of that relatively heavily loaded TRP may cause a request to be sent to another TRP that requests that TRP to send the MsgB to the UE.

Some embodiments may be used where there is contention-based access for a radio channel. For example, some embodiments may be used with NR Unlicensed Access. Some examples of contention-based access for the radio channel are listen before talk (LBT) or clear channel assessment (CCA). In these embodiments, there may be one or more advantages in having the opportunity to deliver MsgB from two or more candidate responding TRPs, which may have different interference scenarios.

In a classical (4-step) RACH procedure, the UE sends a preamble on RO associated with the selected SSB beam. In other words, the TRP (to which the preamble is sent) only knows which, among its beams, is the preferred beam for this UE. In the previously proposed 2-step RACH procedure, this beam will be used for transmitting/receiving MsgA and MsgB (and the corresponding HARQ-ACK). This assumes that there is beam correspondence, i.e. the beam that is selected by the UE based on DL RS and which will be used for sending MsgA is also good to send MsgB (from the gNB to UE). However, it may happen that after sending MsgA, a blockage occurs on the selected beam, meaning that MsgB will not be received correctly. This may result in sending this message multiple times and/or starting the RACH procedure from the beginning. It should be appreciated that the selected SSB beam may not be the "best" beam for the UE for a variety of reasons (e.g. best beam might increase human body exposure). Thus embodiments which provide two or more selected SSB beams may provide a more robust system.

In some embodiments, providing such additional information on one or more alternative beam(s) and potential TRP(s) to use may be beneficial for operation in unlicensed spectrum.

In the described embodiments, one preferred beam from one TRP and one preferred beam from another TRP are determined. In some embodiments a plurality of preferred beams may be determined and used alternatively or additionally.

In some embodiments, more than two preferred beams may be determined. For example, the MsgB may be transmitted on more than 2 beams.

In some embodiments a set of preferred beams is determined and a subset of beams of that set is determined on which the MsgB is to be transmitted.

Thus, depending on whether the other TRP is in the same cell or different cells:
If both TRPs are in the same cell: in this case, the apparatus of the UE causes the UE to report the beam ID.
If both TRPs are in different cells: in this case, the apparatus of the UE causes the UE to report the beam ID and the cell ID.

As mentioned earlier, the information described above may be sent as part of MsgA:
As part of the uplink control information. With this alternative, a field in the uplink control information part of MsgA may be provided.
As part of MAC CE. In this case, a control element should be defined.
Using the preamble index. In this case, the preamble space is partitioned in such a way that the choice of preamble index is for example associated with the beam ID from the involved TRPs. To indicate cell ID in case of TRP in a different cell, different preamble subsets could be used.
Using the PRACH Occasion (RO). In this case, the ROs associated with each SSB are partitioned in such a way that the choice of the RO is for example associated with the beam ID from the respective TRPs. To indicate cell ID in case of a TRP in a different cell, one or more different ROs may be used.

Depending on the selected beam of each TRP, there may be situations where the MsgB needs to be sent from TRP1 and TRP2 at the same time. This may happen if the selected beams are associated with the same time instance. In this case, the UE needs to be able to receive from both TRPs simultaneously. If the UE does not have such a capability or if the network does not know yet (e.g. in case of initial access) whether the UE has such a capability, then the network can for instance simply delay the transmission of MsgB from one of the TRPs (for example the secondary TRP2) until the next available opportunity. As another alternative, the MsgB can be sent in a way similar to single frequency network (SFN) transmission for multicast/broadcast.

In some embodiments, the apparatus of the first TRP may attempt to send MsgB a given number of times (e.g. one or more times), and in case the first TRP does not receive an ACK, the apparatus of the first TRP may cause the first TRP to send a request to the second TRP requesting the second TRP to send MsgB.

In some embodiments, the apparatus of the first TRP may cause the first TRP to send a request to the second TRP requesting the second TRP to send MsgB in the case the first TRP has not received any HARQ-ACK for its transmission (s) of MsgB.

In some embodiments, the network may control configure whether or not the UE reports the preferred beam from a second TRP in addition to the first TRP. The network may determine the number of beams which are reported by the UE to the first TRP.

Figure 12:
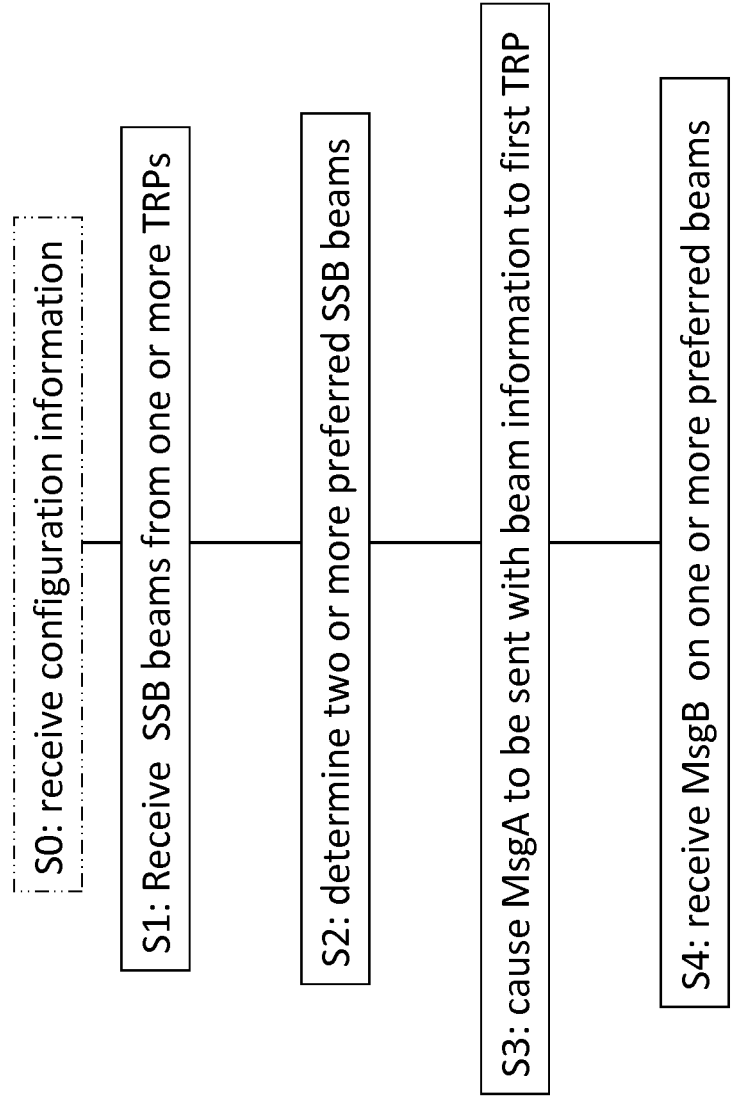
FIG. 12 shows a method at least partially performed by an apparatus of a communications device.

Reference is made to FIG. 12 which shows a method performed at least partially by an apparatus of a communications device.

Optionally, in some embodiments, in step S0, the apparatus of the communications device may receive configuration information from the network indicating one or more of the number of beams to be reported and/or the number of TRPs from which one or more beams are to be reported. In other embodiments, the apparatus of the communication device may use one or more defaults or make a determination based on one or more factors or parameters.

In step S1, the communications device receives SSB beams from one or more TRPs.

In step S2, the apparatus of the communications device determines two or more preferred SSB beams. The beams may be from the same or different TRPs.

In step S3, the apparatus of the communications device causes the communications device to transmit MsgA to a first or primary TRP. Beam information for the plurality of preferred beams is provided with or as part of MsgA. The beam information may comprise beam identity information and/or cell information and/or any other information which identifies the beam.

In step S4, the communications device will receive MsgB on one or more of the preferred beams.

Figure 13:
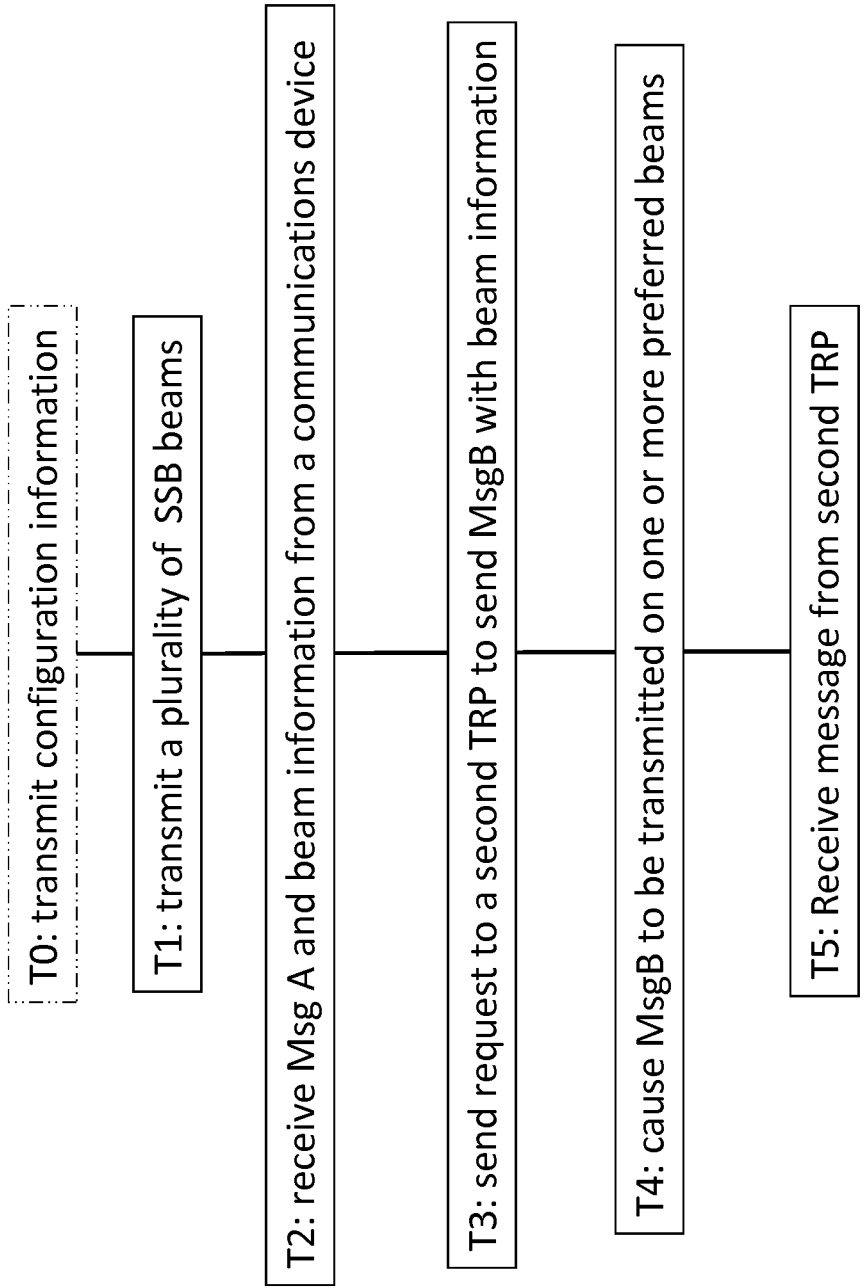
FIG. 13 shows a method at least partially performed by an apparatus of a primary transmission reception point.

Reference is made to FIG. 13 which shows a method performed at least partially by an apparatus of a primary TRP.

Optionally, in some embodiments, in step T0, the apparatus of the TRP may cause configuration information to be transmitted to the communication device. The configuration information from the network may indicate one or more of the number of beams to be reported and/or the number of TRPs from which one or more beams are to be reported.

In step T1, the apparatus causes the primary TRP to transmit SSB beams.

In step T2, the apparatus of the TRP receives MsgA and beam information. Beam information for a plurality of preferred beams is provided with or as part of MsgA. The beam information may comprise beam identity information and/or cell information and/or any other information which identifies the beam. The apparatus will determine which one or more beams are associated with that primary TRP and which one or more beams are associated with one or more secondary TRPs.

In step T3, the apparatus will cause a message to be transmitted to the one or more secondary TRPs requesting that the respective TRP send a MsgB. Associated beam information is provided to the one or more secondary TRPs.

In step T4, the apparatus will cause the primary TRP to transmit a MsgB on one or more of the preferred beams for the primary TRP.

Optionally, in step T5, the apparatus will receive a message from the secondary TRP. This message may indicate to the primary TRP the success or failure of the MsgB transmission (from the secondary TRP).

Figure 14:
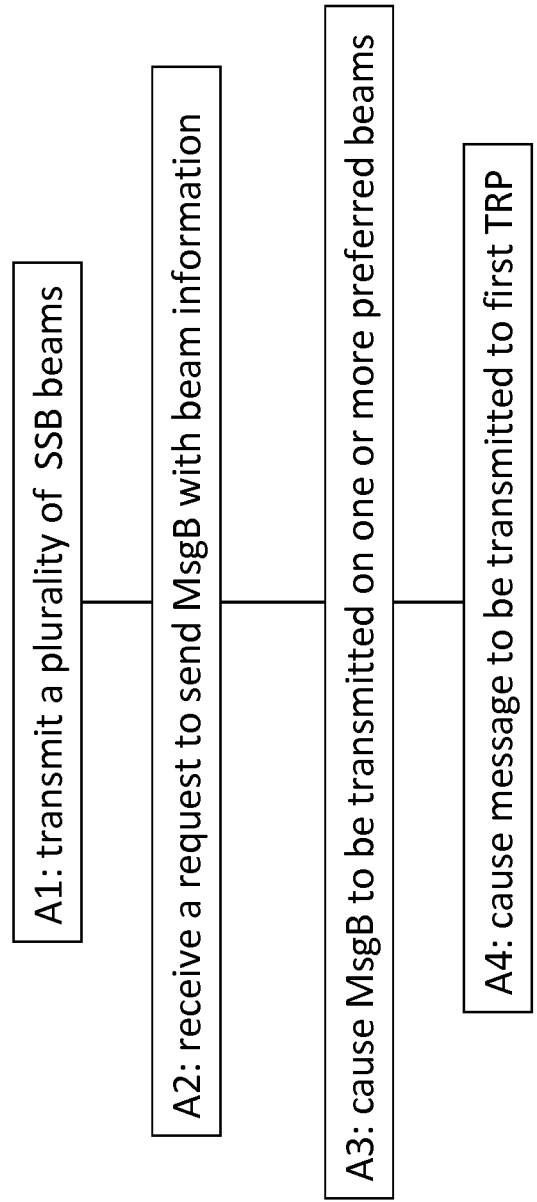
FIG. 14 shows a method at least partially performed by an apparatus of a secondary transmission reception point.

Reference is made to FIG. 14 which shows a method performed at least partially by an apparatus of a secondary TRP.

In step A1, the apparatus causes the secondary TRP to transmit SSB beams.

In step A2, the secondary TRP will receive a message from a primary TRP requesting that the secondary TRP send a MsgB. Associated beam information is provided to the secondary TRPs.

In step A3, the apparatus will cause the secondary TRP to transmit a MsgB on one or more of the preferred beams for that secondary TRP.

In step A4, the apparatus will cause the secondary TRP, after the reception of the HARQ-ACK feedback from the communication device, to send a message to inform the primary TRP of the success or failure of the MsgB transmission from the secondary TRP.

Figure 15:
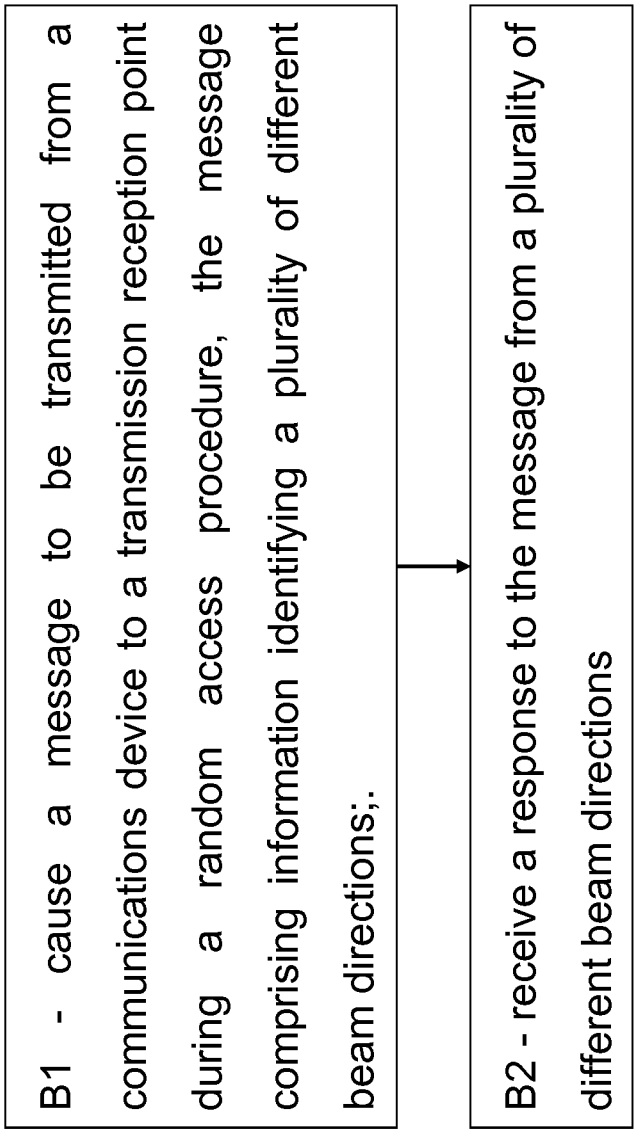
FIG. 15 shows a method performed by an apparatus of a communications device.

Reference is made to FIG. 15 which shows a method performed by an apparatus. The apparatus may be provided in a communications device or be a communications device.

In step B1, the method comprises causing a message to be transmitted from a communications device to a transmission reception point or network element during a random access procedure. The message comprises information identifying a plurality of different beam directions.

In step B2, the method comprises receiving a response to said message from a plurality of different beam directions.

Figure 16:
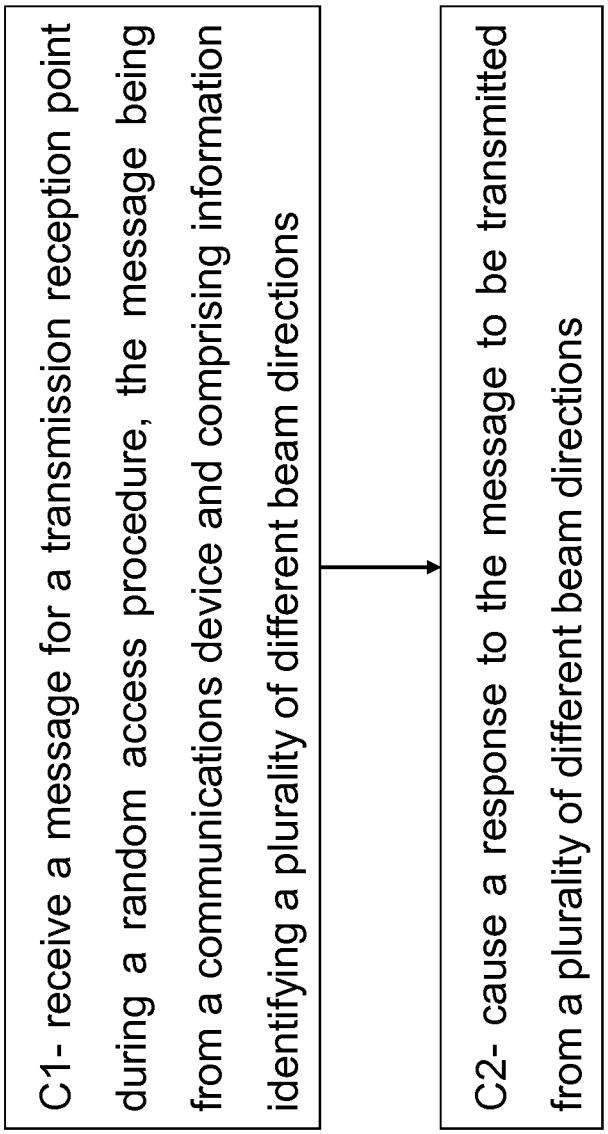
FIG. 16 shows a method performed by an apparatus of a primary transmission reception point.

Reference is made to FIG. 16 which shows a method performed by an apparatus. The apparatus may be provided in a primary TRP or network element or be a TRP or network element.

The method comprises in step C1 receiving a message for a transmission reception point during a random access procedure. The message is from a communications device and comprises information identifying a plurality of different beam directions.

The method comprises in step C2 causing a response to said message to be transmitted from a plurality of different beam directions.

Figure 17:
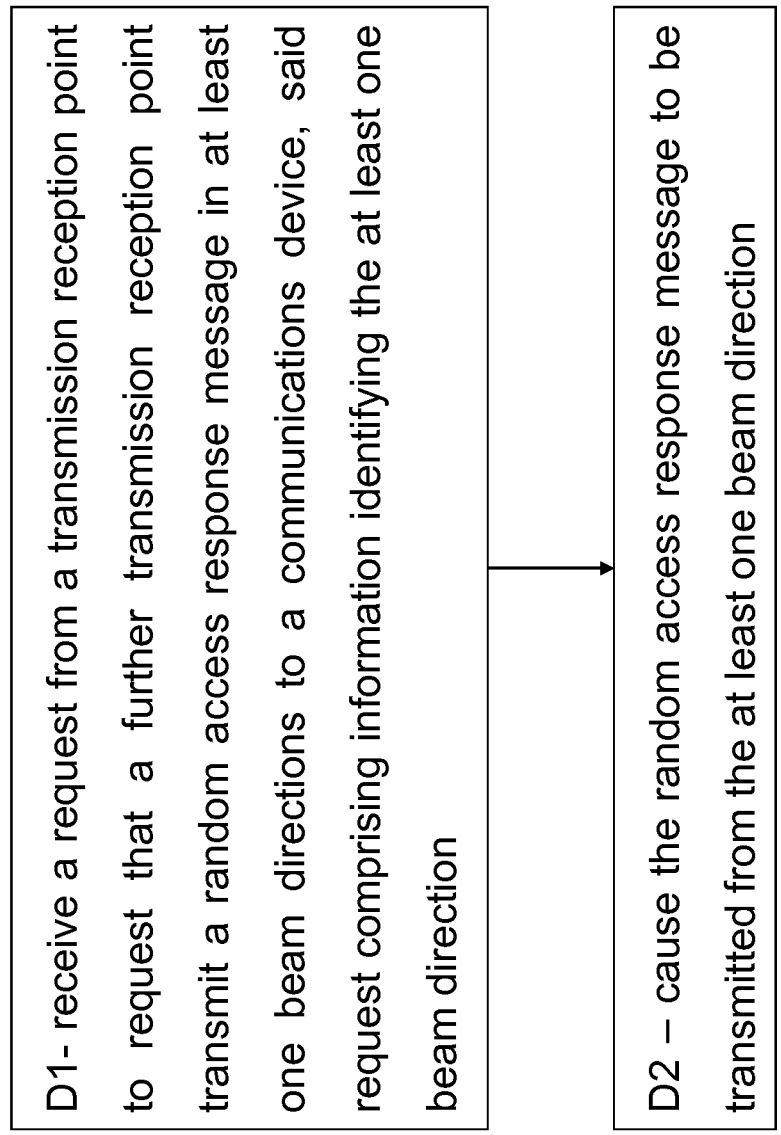
FIG. 17 shows a method performed by an apparatus of a secondary transmission reception point.

Reference is made to FIG. 17 which shows a method performed by an apparatus. The apparatus may be provided in a secondary TRP or network element or be a TRP or network element.

The method comprises in step D1, receiving a request from a transmission reception point to request that a further transmission reception point transmit a random access response message in at least one beam direction to a communications device. The request comprises information identifying said at least one beam direction.

The method comprised in step D2 causing the random access response message to be transmitted from said at least one beam direction.

It is noted that while the above describes example embodiments, there are several variations and modifications which may be made to the disclosed solution without departing from the scope of the present invention. In particular, different embodiments have been described. Different features from different embodiments may be combined.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
   (i) a combination of analogue and/or digital hardware circuit(s) with software/firmware and
   (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A method comprising:
   causing a MsgA message to be transmitted from a communications device to a transmission reception point during a random access procedure, said MsgA message comprising information identifying a plurality of different beam directions, wherein the information identifying the plurality of different beam directions is provided using a preamble index; and
   monitoring a MsgB message in response to said MsgA message from the plurality of different beam directions.

2. An apparatus comprising at least one processor and at least one memory including computer code for one or more programs, the at least one memory and the computer code configured, with the at least one processor, to cause the apparatus at least to:
   cause a MsgA message to be transmitted from the apparatus to a transmission reception point during a random access procedure, said MsgA message comprising information identifying a plurality of different beam directions, wherein the information identifying the plurality of different beam directions is provided using a preamble index; and
   monitor a MsgB message in response to said MsgA message from the plurality of different beam directions.

3. The apparatus as claimed in claim 2, wherein the at least one memory and the computer program code are configured to, with the at least one processor, cause the apparatus at least to receive reference beam signals from one or more transmission reception points.

4. The apparatus as claimed in claim 3, wherein the reference beam signals comprise synchronization signal block beams.

5. The apparatus as claimed in claim 2, wherein the at least one memory and the computer program code are configured to, with the at least one processor, cause the apparatus at least to determine a plurality of preferred beam directions, said information identifying a preferred beam direction.

6. The apparatus as claimed in claim 5, wherein said information comprises a beam identity of said preferred beam direction and a cell identity associated with a respective beam.

7. The apparatus as claimed in claim 2, wherein the information identifying the plurality of different beam directions is provided: as part of uplink control information; as part of one or more media access control control elements; and/or using a physical random access channel occasion.

8. The apparatus as claimed in claim 2, wherein the at least one memory and the computer program code are configured to, with the at least one processor, cause the apparatus at least to receive configuration information indicating one or more of: a number of beam directions to be identified in said message; and a number of transmission reception points from which one or more beam directions are to be identified in said message.

9. An apparatus comprising at least one processor and at least one memory including computer code for one or more programs, the at least one memory and the computer code configured, with the at least one processor, to cause the apparatus at least to:
   receive a MsgA message for a transmission reception point during a random access procedure, said MsgA message being from a communications device and comprising information identifying a plurality of different beam directions, wherein the information identifying the plurality of different beam directions is provided using a preamble index; and
   cause a MsgB message in response to said MsgA message to be transmitted from the plurality of different beam directions.

10. The apparatus as claimed in claim 9, wherein the at least one memory and the computer program code are configured to, with the at least one processor, cause the apparatus at least to cause a plurality of reference beam signals to be transmitted to said communications device.

11. The apparatus as claimed in claim 10, wherein the reference beam signals comprise synchronization signal block beams.

12. The apparatus as claimed in claim 9, wherein said information comprises one or more of a beam identity of a respective preferred beam direction and a cell identity associated with a respective beam.

13. The apparatus as claimed in claim 9, wherein the information identifying the plurality of different beam directions is provided: as part of uplink control information; as part of one or more media access control control elements; and/or using a physical random access channel occasion.

14. The apparatus as claimed in claim 9, wherein the at least one memory and the computer program code are configured to, with the at least one processor, cause the apparatus at least to cause configuration information to be transmitted to said communications device, said configuration information indicating one or more of: a number of beam directions to be identified in said message; and a number of transmission reception points from which one or more beam directions are to be identified in said message.

15. The apparatus as claimed in claim 9, wherein the at least one memory and the computer program code are configured to, with the at least one processor, cause the apparatus at least to cause a request to be transmitted to a further transmission reception point to request that said further transmission reception point transmit said response in at least one of said plurality of different beam directions.

* * * * *